Oct. 14, 1952　　　W. A. SCHNITZLER　　　2,613,353
WELDING HELMET WITH AIR PRESSURE RESPONSIVE
SHIFTABLE EYE PROTECTIVE LENS
Filed May 25, 1950
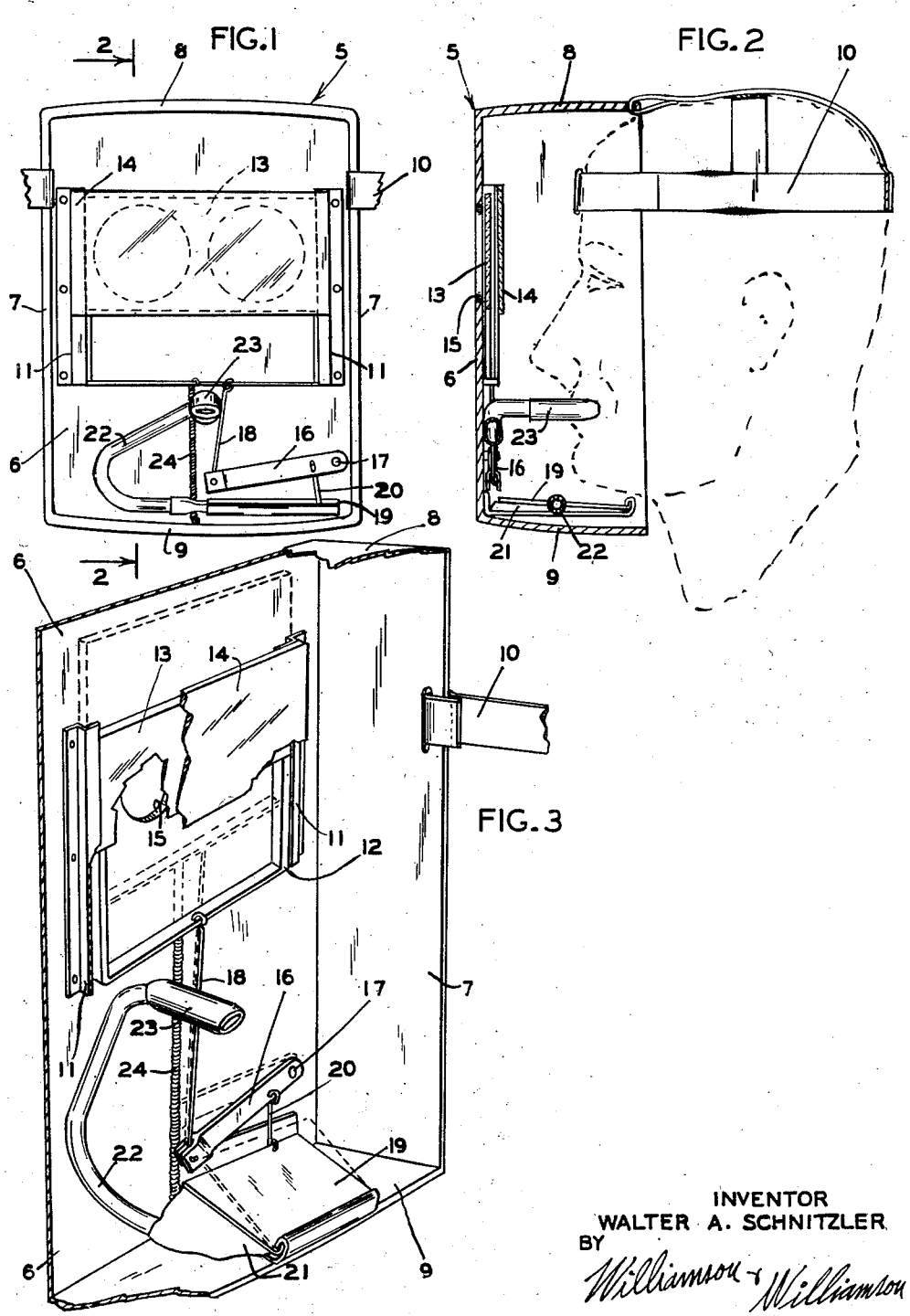
INVENTOR
WALTER A. SCHNITZLER
BY
ATTORNEYS Patented Oct. 14, 1952

2,613,353

UNITED STATES PATENT OFFICE 2,613,353

WELDING HELMET WITH AIR PRESSURE RESPONSIVE SHIFTABLE EYE PROTECTIVE LENS

Walter A. Schnitzler, Emerald, Wis.

Application May 25, 1950, Serial No. 164,250

1 Claim. (Cl. 2—8)

This invention relates generally to welding helmets and particularly to a helmet embodying a controllably releasable anti-glare lens.

It has long been a problem for welders using electric arc welding apparatus to properly position the electrode preliminary to striking the electric arc and yet establishing the protective shield in front of their eyes at the moment the arc is established.

It is an object of my invention to provide a welding helmet having a shiftable anti-glare lens mounted therein and embodying air pressure responsive mechanism for shifting said lens from one position to another.

More specifically, it is an object to provide a welding helmet having a shiftably mounted anti-glare shield adapted to be controllably interposed between the eyes of the welder and the electric arc and embodying air responsive mechanism, a conduit adapted to be held in the mouth of the operator for actuating said air responsive mechanism when air pressure is supplied thereto by the welder.

These and other objects and advantages of the invention will more fully appear from the following description made in connection with the accompanying drawings, wherein like reference characters refer to the same or similar parts throughout the various views, and in which:

Fig. 1 is a rear elevational view of my welding helmet showing the lens in eye protective position;

Fig. 2 is a transverse vertical sectional view taken substantially along the line 2—2 of Fig. 1; and Fig. 3 is a perspective view of the structure shown in Fig. 1 showing the eye protective lens in protective position by full lines and in raised position by dotted lines.

As illustrated in the accompanying drawings, I provide a novel and highly efficient welding helmet having the shield portion designated as an entirety by the numeral 5 and having the front panel 6, side panels 7, top panel 8 and bottom panel 9. The entire shield is made from any suitable light-weight opaque material such as fiber-board as is conventionally used on present welding helmets. A head strap 10 is provided to hold the helmet in the proper position on the welder's head as shown in Fig. 2.

A pair of opposed substantially parallel upstanding guides 11 are fixed on the inside of the front panel 6 and are adapted to slidably receive an anti-glare lens frame structure 12 therein. A lens having anti-glare properties such as the colored lens 13 is fixed in the upper portion of said frame 12 and a clear lens 14 is rigidly mounted to the guide members 11 and extends across the viewing openings 15 which are formed in the front panel of the shield 5.

A frame actuating lever 16 is pivotally mounted in the lower portion of the front panel 6 as by the pivot pin 17 and a link interconnects the outer free end of said lever 16 with the lower cross member of frame 12 and is designated by the numeral 18. A member responsive for shifting movement to air pressure such as the hinged member 19 which is hingedly connected along one edge to the bottom panel 9 as best shown in Fig. 3. The free swinging end of said air responsive member 19 is connected to an intermediate portion of the lever 16 as by the link 20.

An air confining flexible bag 21 is mounted under the hinged member 19 and interposed between said member and the bottom panel 9. A conduit 22 communicates with the inside of said bag 21 and has a mouthpiece such as the rubber element 23 connected to the upper free end thereof. This mouthpiece 23 is adapted to be received in the mouth of a welder during the use of the helmet.

The following is a description of the operation of my improved welding helmet. When the helmet has been mounted on the head of the welder the anti-glare lens may be raised into the dotted position shown in Fig. 3 to permit clear view of the electrode and the work before the electric arc is struck. This is done by blowing into the mouthpiece 23 and conduit 22 to blow up the air confining bag 21 into expanded relation as shown by the dotted position of Fig. 3. This raises the member 19, which movement is transferred to the lever 16 and transferred up to the frame 12 by the link 18. The tongue of the welder may be held against the opening in the mouthpiece 23 to maintain the anti-glare lens in raised position. When the welding electrode is in the desired position pressure is released from the bag 21 and a resilient element such as the spring 24 urges the frame 12 downwardly into the full line position of Figs. 1, 2 and 3.

It will be seen that I have provided a relatively simple yet highly efficient welding helmet in which the anti-glare lens can be easily shifted from eye protective position into raised position to permit clear view of the electrode position relative to the work preliminary to beginning the welding operation. It is, of course, necessary, due to the extremely bright light produced by the welding arc, to use a rather dark almost opaque anti-glare lens 13 and therefore it is impossible to see through this lens in ordinary illumination. Therefore, in order to properly position the welding electrode in ordinary light, it is necessary to remove the anti-glare lens from in front of the welder's eyes. In conventional helmets this is done by a hinged mounting on the head harness, but this requires the use of the operator's hands as a rule to shift downwardly into eye protective position or at least requires the operator to give a relatively violent nod of the head to shift the helmet downwardly into protective position. In either case, the position of the electrode which has been obtained is shifted and the arc is struck at some other point that might easily damage the work. With my device, it is very easy to maintain the desired position of the electrode until the arc is struck and completely obviates the danger of damaging the work.

It will, of course, be understood, that various changes may be made in the form, details, arrangement and proportions of the various parts without departure from the scope of the present invention, which, generally stated, consists in the matter shown, and described, and set forth in the appended claim.

I claim:

A shield unit for use by welders comprising an opaque shield adapted to be mounted on a welder's head and having an opening therein disposed in front of the welder's eyes, a shiftable anti-glare lens normally interposed between said opening and the eyes of the welder, guiding means mounted on said shield for guiding said lens during its shifting movement, an air confining flexible bag mounted with a portion thereof engaged against the inner surface of said shield, a plate engaged against an opposed surface of said bag and shiftable when air under pressure is applied to the interior of said bag, linkage interconnecting said shiftable bag engaging plate and said lens for transmitting the shifting movement of said plate to said lens, and a mouth piece connected with said bag to permit a welder to blow therein and apply air pressure thereto to shift said lens out of normal position.

WALTER A. SCHNITZLER.

REFERENCES CITED

The following references are of record in the file of this patent:

UNITED STATES PATENTS

| Number | Name | Date |
|---|---|---|
| 1,877,024 | Norton | Sept. 13, 1932 |
| 2,154,774 | Rienacker et al. | Apr. 18, 1939 |
| 2,272,001 | Goode | Feb. 3, 1942 |